Jan. 9, 1968   K. G. CUNNINGHAM   3,362,548
EXCAVATING APPARATUS
Filed May 26, 1966   5 Sheets-Sheet 1
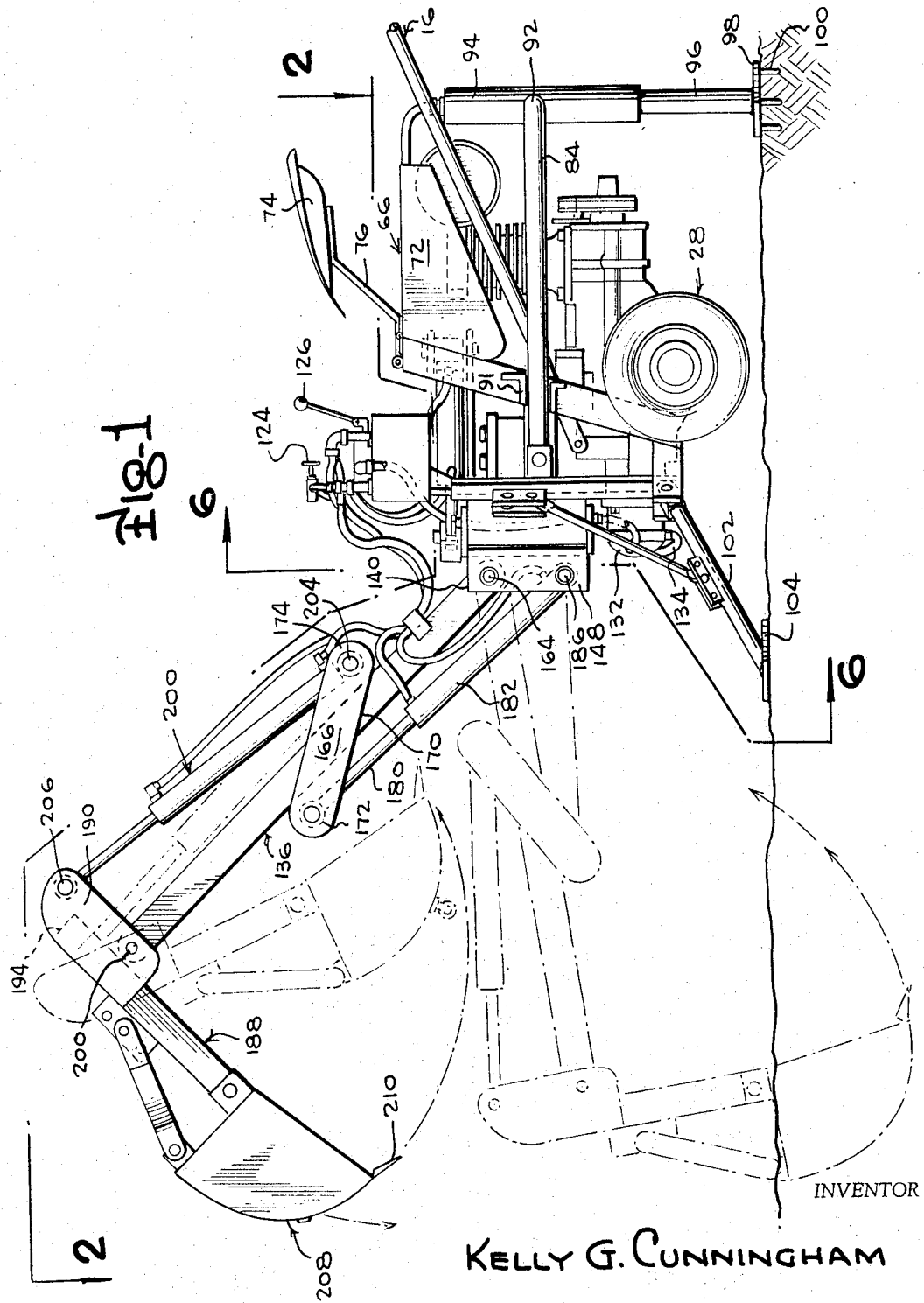
INVENTOR
KELLY G. CUNNINGHAM
BY Robert G. McMorrow
ATTORNEY

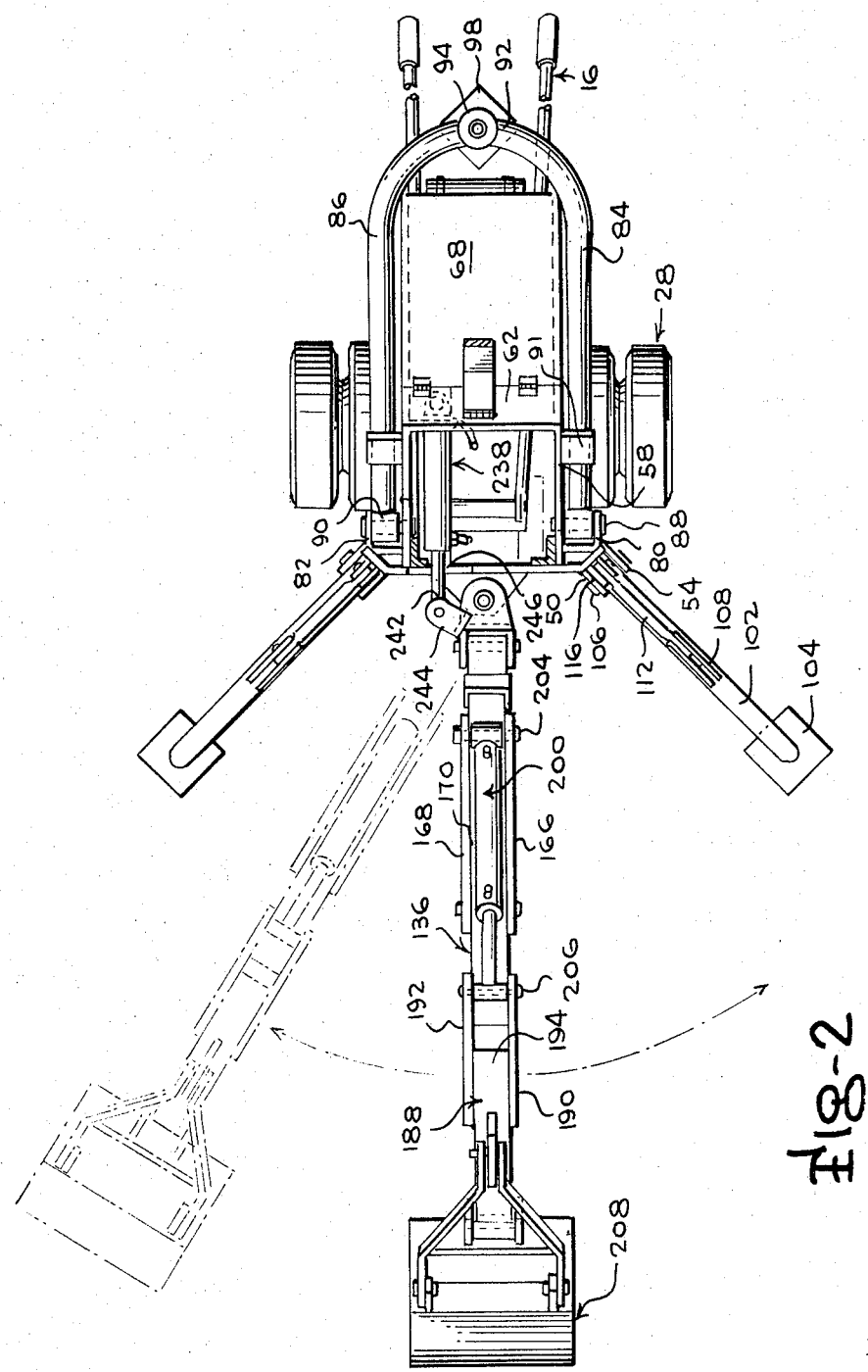

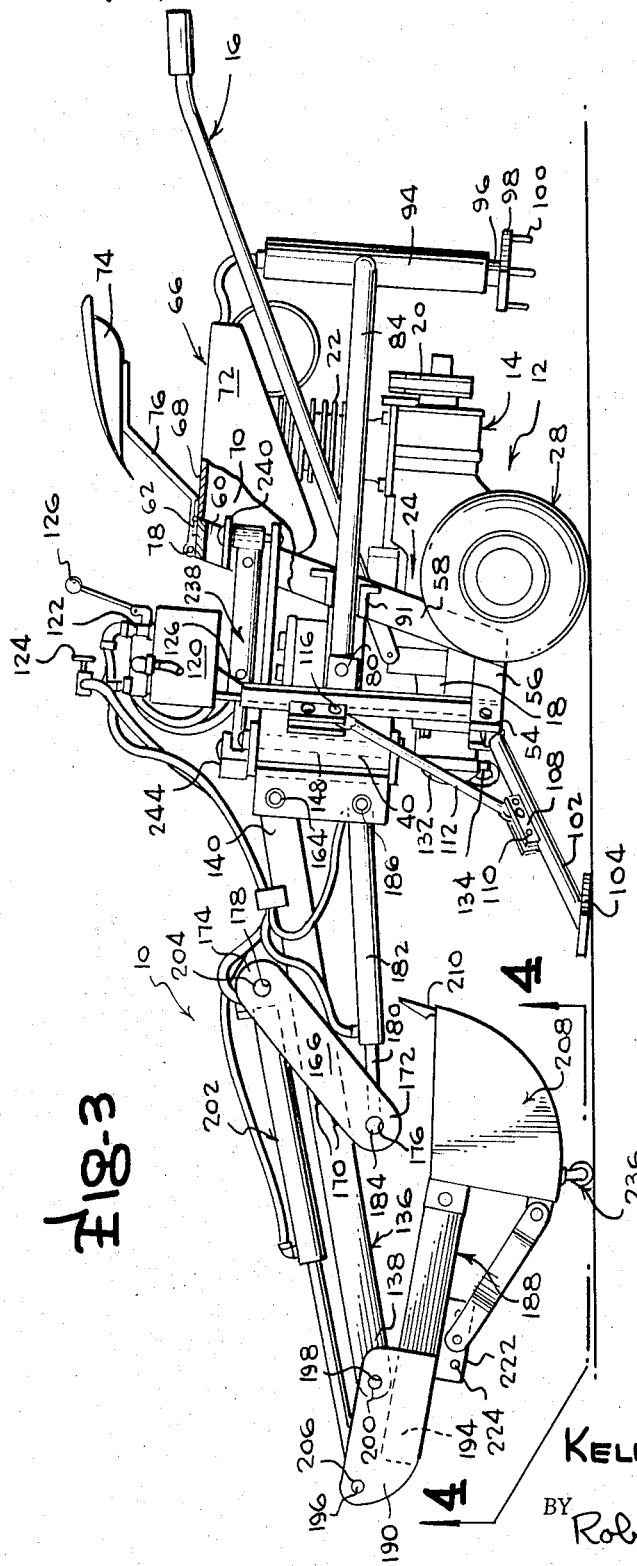

Jan. 9, 1968 K. G. CUNNINGHAM 3,362,548
EXCAVATING APPARATUS
Filed May 26, 1966 5 Sheets-Sheet 4
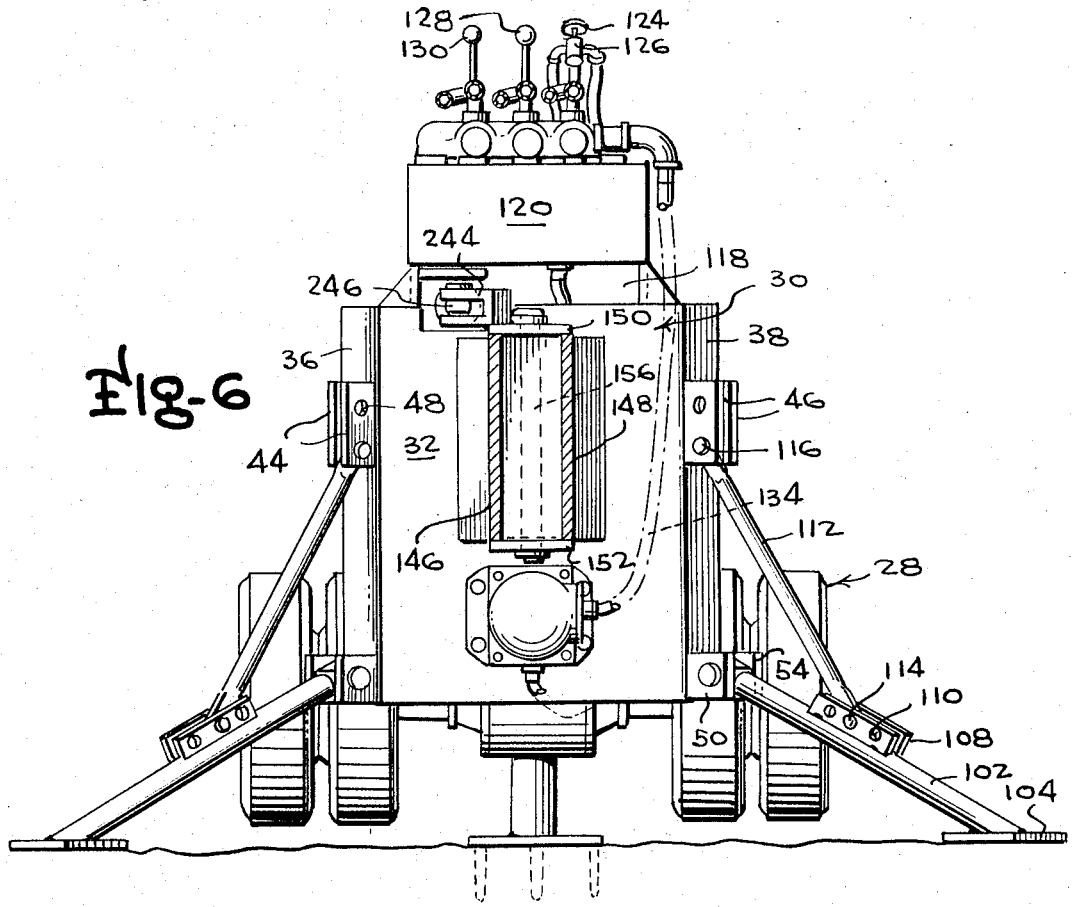
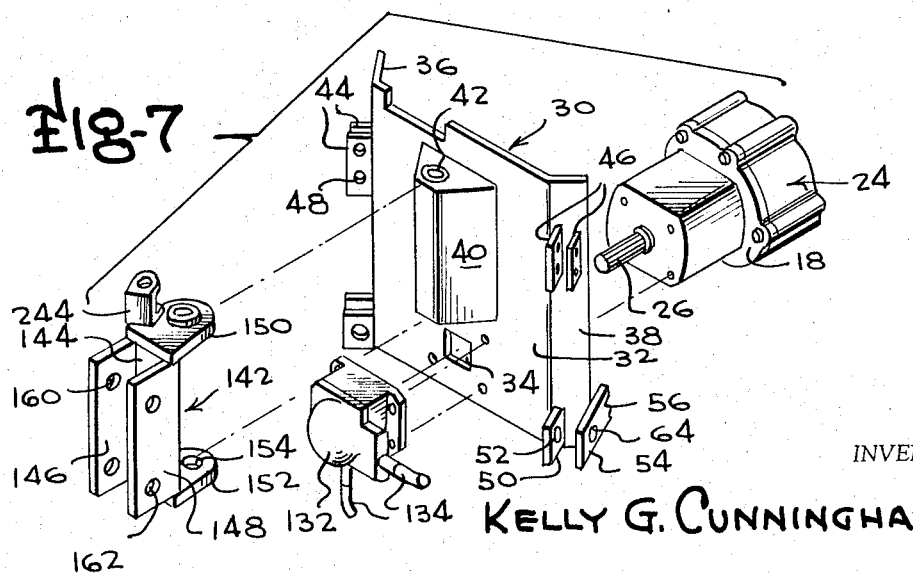
INVENTOR
KELLY G. CUNNINGHAM
BY Robert G. McMorrow
ATTORNEY

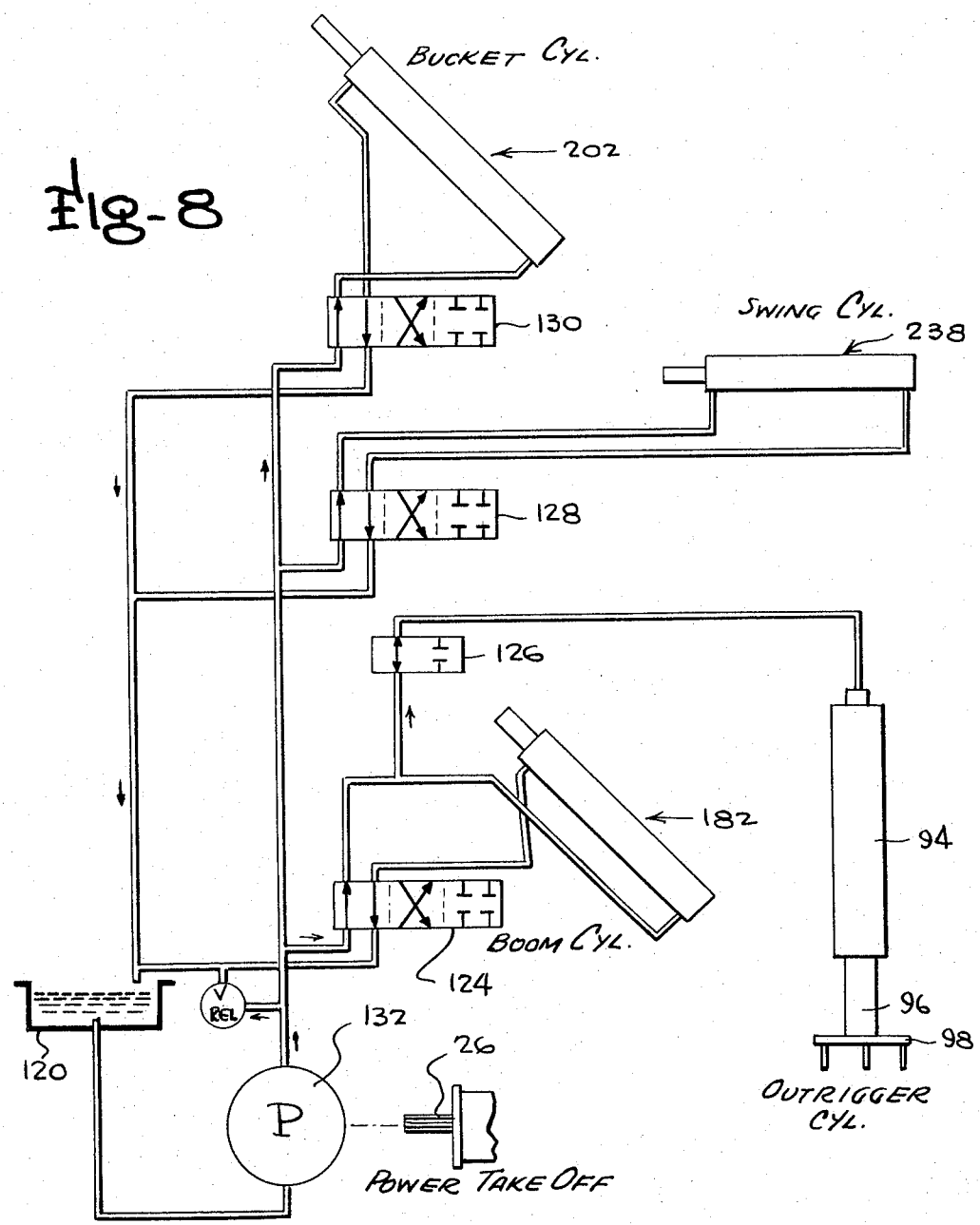

United States Patent Office 3,362,548
Patented Jan. 9, 1968

3,362,548
EXCAVATING APPARATUS
Kelly G. Cunningham, 1419 Myers Ave.,
Dunbar, W. Va. 25064
Filed May 26, 1966, Ser. No. 553,076
4 Claims. (Cl. 214—138)

ABSTRACT OF THE DISCLOSURE

A detachable, hydraulically powered back hoe for use with a single axle prime mover, the back hoe having a centrally located, hydraulic outrigger, and two manually operated forward supports.

This invention relates to excavating apparatus suited to use with a small prime mover, the prime mover having other areas of utilization.

A basic objective of this invention resides in the provision of compact excavating apparatus which is readily attachable to a prime mover and employs the power source of the prime mover. Related to this objective is the advantage of providing a device of the type described which permits conversion of the prime mover from other uses to that here involved with a minimum of time and effort.

Another important object of this invention concerns the provision of a new and novel support system for an attachment of this type, the system serving to provide multiple ground engaging legs supporting the excavating tool and spacing the prime mover upwardly from the ground.

A further object of the present invention relates to the provision of an adjustable support leg in a multiple point support system whereby the system is adequately arranged for use despite terrain contours.

More restrictive objectives include the provision of excavating apparatus in the form of back hoes or the like particularly adapted for use in conjunction with two wheeled prime movers such as garden tractors, the apparatus being adequately stabilized by a three-point mounting system, at least one point of which is vertically adjustable, and the apparatus including an operator's seat platform.

Other and further objects and advantages of the invention will become apparent to those skilled in the art from a consideration of the following specification, when read in conjunction with the annexed drawings, in which:

FIGURE 1 is a side elevational view showing excavating apparatus constructed and assembled in accordance with the features of this invention, showing in phantom lines the operation of the apparatus;

FIGURE 2 is a top plan view, partially in section on the line 2—2 of FIGURE 1, looking in the direction of the arrows;

FIGURE 3 is another side view on reduced scale showing the position of the elements with the device in transport position;

FIGURE 4 is an enlarged view of a bracket hereof, taken from the line 4—4 of FIGURE 3;

FIGURE 5 is a further enlarged detail sectional view on the line 5—5 of FIGURE 4, looking in the direction of the arrows;

FIGURE 6 is an enlarged vertical cross sectional view on the line 6—6 of FIGURE 1, looking in the direction of the arrows;

FIGURE 7 is a disassembled perspective view of certain components of the apparatus; and FIGURE 8 is a diagrammatic layout of a typical hydraulic circuit of the invention.

With more specific reference to the drawings, excavating apparatus in accordance with this invention is therein shown and designated generally by reference numeral 10. In this embodiment of the invention, the apparatus 10 is illustrated as adapted for use with a commercially available two wheeled garden tractor 12. In such tractors, suitable framework 14 is supplied comprising an engine and drive housing. The framework includes control handle means 16, and the tractor has a forward end 18 and rear end 20. The framework houses an engine 22 with a suitable power transmission means 24 terminating in a forwardly projected power take-off shaft 26, shown in FIGURE 7. The tractor normally operates on two dual ground wheels 28 and mowers, snow removal equipment, and similar utensils are usually attached to the forward end of the device for use of the power take-off shaft 26.

The tractor per se forms no part of this invention and specifically different prime movers may be adapted for employment with the attachment 10. In this embodiment of the invention however the apparatus comprises a tool of the type known as a back hoe, employed in ditching, material displacement, and the like.

A main structural component of the apparatus 10 comprises a mounting plate 30 which is vertically arranged in use and has a central body section 32 with an opening 34 therein. Angularly related side plates 36, 38 are secured either integrally or otherwise to the section 32, and a bearing block 40 is fixed to the section 32 over the opening 34. The block 40 has a vertically extending opening 42 formed therein for a purpose appearing below. Pairs of brackets 44 and 46 with plural aligned openings 48 therein are fixed to the side plates 36 and 38 to serve as upper leg mounting means, and each plate has a connection lug 50 extending therefrom with an opening 52 therein. The lugs 50 are aligned with the outer ends 54 of the foot members 56 of L-shaped structural elements 58 which terminate at their tops 60 in a connecting cross brace 62. The ends 54 are apertured at 64 in alignment with the openings 52 of the lugs, thus to provide lower leg mounting means on the plate.

The framework of the apparatus 10 further comprises a shroud 66 best shown in FIGURE 3 comprising a top plate 68 and gussets 70, 72 hingedly connected to the cross brace 62 in such manner as to overlie and shield the engine 22 of the prime mover and movable for access thereto. An operator's seat 74 is mounted over the shroud 66 on the bracket 76 hinged at 78 to the cross brace 62.

Referring to FIGURE 2, it is therein shown that clevis assemblies 80, 82 are connected to the rear of the plate 32 and side plates 36, 38 for mounting tubular bar elements 84 and 86. Changeable fasteners 88 extend through the clevis assemblies and the enlarged forward ends 90 of the bars providing a secure connection therebetween, passing between structural braces 91 on the elements 58, and the bar outer ends 92 are fixed to a vertically extending element 94 comprising a housing for a rear support pedestal or outrigger in the form of an extensible leg 96. The leg 96 is hydraulically actuated, in a manner described below, and has a base plate 98 at its lower end with ground penetrating spikes 100 thereon.

Forward support means for the attachment comprise tubular leg elements 102 with ground plates 104 on their distal ends, and secured at their proximal ends between the lugs 50 and ends 54 by changeable fasteners 106. Pairs of clamping plates 108, with plural groups of openings 110 therein, are secured to the elements 102 and leg braces 112 are secured by fasteners 114 between selected pairs of openings 110 in the plates. The braces are further secured by fasteners 116 between the pairs of plats 46 and 48, respectively. It will be observed that the angularity of the forward leg elements 102 is variable by changes in location of the braces 112 in the openings 48 and 110. Thus, with the variance in height of the rear leg 96, the height of the framework is variable in accordance with terrain requirements, levelling needs, and the like. The prime mover is completely out of contact with the ground, thus avoiding wear and damage to the prime movers during excavating or digging operations.

In FIGURES 3 and 6, it is seen that the support bracket 118 projects upwardly from the plate 32 and a fluid reservoir housing 120 is mounted thereon. Secured to the housing are inlet and outlet valve assemblies 122 and a plurality of hydraulic controls 124, 126, 128 and 130. Control 124 regulates the extension and retraction of the outrigger leg 96, the function of the remaining controls appearing below in greater detail. With further reference to FIGURES 6 and 7, a hydraulic pump assembly of any suitable type 132 is shown mounted about the power take-off shaft 26 on the plate 32. The pump is operatively associated with the shaft and is connected to the reservoir and controls by conduits 134.

An excavating assembly of the invention comprises an elongated, substantially rectangular main tool support boom 136 having an outer end 138 and an inner end 140. A bracket 142, including a bight portion 142 and outward arms 146, 148, has clevis plates 150, 152 with vertically aligned openings 154 therein. A pin 156 is employed to pivotally connect the bracket 142 to the bearing block 40 for horizontal movement by extension of the pin through the openings 154 and the opening 42. The arms 146 and 148 have two pairs of coaligned apertures 160 and 162 therein, and the end 140 of the main tool support boom 136 is pivoted between the uppermost pair 160 of the apertures on a cross bolt 164 for vertical pivoting movement. A pair of link elements 166, 168 are fixed to the boom 136 intermediate its ends on opposite sides, as by welds 170, the ends 172 of the link elements beneath the boom being located outwardly of the other ends 174 thereof. Each of the ends 172 and 174 have aligned pairs of openings 176, 178, respectively, therein, and the extensible portion 180 of a hydraulic cylinder assembly 182 is pivoted between the openings 176 by a bolt 184. The opposite end of the assembly 182 is pivoted between the bracket arms 146, 148 by a pin 186.

A shovel boom 188 of reduced length in comparison to the boom 136 has top plates 190, 192 fixed to its upper end 194 on opposite sides and extending outwardly of the boom at both the top and the side adjacent the main boom 136. The top plates have one pair of holes 196 therein located linearly outward of the end 194, and a second pair of holes 198 spaced inwardly therefrom. A cross bolt 200 extends through the holes 198 and an aligned opening in the outer end 138 of the main tool support boom 136, thereby pivoting the shovel boom to the main tool support boom. An extensible hydraulic cylinder 202 for the bucket is pivoted at one end on a bolt 204 extended through the openings 178 of the link elements 166, 168, and at its other end on a cross element 206 extended through the openings 196 in the plates 190 and 192. It will be observed that extension of the bucket cylinder 202 forces the plates to pivot, carrying with them the boom 188.

A bucket 208 having a toothed leading edge 210 and back wall 212 is provided. Extended from the wall 212 are ears 214, 216, and a pin 218 is extended through the ears and through the end 220 of the boom 188. An adjustment plate 222 with plural openings 224 therein depends from the boom and a yoke composed of yoke sides 226, 228 is connected thereto by a pin 230. The yoke outer ends are secured to further connection ears 232, 234 on the bucket end wall.

As shown in FIGURE 5, a removable caster wheel 236 may be detachably connected on the bucket for convenience in movement of the device from place to place.

A control means for the lateral pivoting of the work elements with respect to the prime mover comprises a swing cylinder 238 (FIGURES 2 and 3) secured at one end to plates 240 connected to one of the tubular elements 58 adjacent its top 60 and the other end 242 of which is secured to a pivot bracket 244 secured to the clevis plate 150 of the bracket 142. As seen in FIGURE 7, the bracket 244 is of U-form and is fixed to the plate 150. Extension and retraction of the movable portion 246 is effective to laterally swing the boom to any desired position about an arc forwardly of the device.

In FIGURE 8, a typical hydraulic arrangement of this invention is shown diagrammatically. Hydraulic force is supplied to the pump 132 which is energized by the prime mover through the power take-off shaft 26. A series of conduit means of conventional form connect the pump with the various hydraulic cylinders 94, 182, 202 and 238 and each is controlled by one of the control means 124–130.

From the foregoing description of the construction and operation of the assembly hereof, it will be observed that a compact excavating apparatus suitable for use with garden tractors and the like is thereby provided. The illustrated embodiment is shown and described merely by way of example, and it will be understood that the invention is to be limited in scope only by the appended claims.

What is claimed is:
1. The combination, with a prime mover of the type having a frame, a power source, ground wheels arranged on an axis in transverse alignment with one another and a handle for tilting the prime mover about the axis of the wheels, of a work attachment comprising:
   a mounting assembly securing the attachment to the prime mover frame;
   a hydraulic system, including a pump, controls and distribution means for fluid transfer, attached to the mounting assembly, the hydraulic system being operatively engaged with the power source of the prime mover;
   boom means extending from the mounting assembly and having hydraulic cylinder means thereon connected to the distributor means of the hydraulic system;
   an implement on the boom means, the implement being movable responsive to actuation of the hydraulic cylinder means;
   a pair of forward leg elements projecting from the mounting assembly and extending in the direction of the implement;
   a rear outrigger support of variable height mounted vertically in a location remote from and spaced between the forward leg elements whereby the forward leg elements and rear outrigger support form a tripod base for the prime mover; and
   the rear outrigger support being controlled by the hydraulic system and being arranged to lift the prime mover from the ground to an elevated work position wherein it is supported by said tripod base.
2. The invention of claim 1, wherein:
   the implement comprises a back hoe including a bucket; and the boom means includes two sections and is pivotal both laterally and vertically.

3. The invention of claim 1, wherein:
the forward leg elements are manually adjustable to compensate for terrain irregularities.

4. The invention of claim 2, wherein:
the bucket has transport wheel means thereon.

References Cited

UNITED STATES PATENTS

| | | | |
|---|---|---|---|
| 2,781,927 | 2/1957 | Holopoinen | 214—138 |
| 3,175,698 | 3/1965 | Dassler | 212—145 |
| 3,243,064 | 3/1966 | Thwaites | 214—138 |
| 3,275,163 | 9/1966 | Schoeff | 214—138 X |

HUGO O. SCHULZ, *Primary Examiner.*